United States Patent [19]

Onishi

[11] 3,731,394

[45] May 8, 1973

[54] CENTRIFUGAL DEHYDRATOR

[75] Inventor: Masayuki Onishi, Nagoya, Japan

[73] Assignee: Tokyo Shibaura Electric Co., Ltd., Kawasaki-shi, Japan

[22] Filed: Dec. 13, 1971

[21] Appl. No.: 207,389

[30] Foreign Application Priority Data

Dec. 11, 1970  Japan.............................45/124629

[52] U.S. Cl. ....................34/58, 188/184, 210/360
[51] Int. Cl. ...........................................F26b 17/24
[58] Field of Search................................34/8, 58, 59; 210/360, 394; 188/184

[56] References Cited

UNITED STATES PATENTS

| 1,997,621 | 4/1935 | Adsi et al. | 34/58 |
| 2,513,798 | 7/1950 | Hatfield | 188/184 |
| 2,633,956 | 4/1953 | Thostenson | 188/184 |

Primary Examiner—Kenneth W. Sprague
Assistant Examiner—James C. Yeung
Attorney—Robert D. Flynn et al.

[57] ABSTRACT

A centrifugal debydrator wherein the drive of a motor is transmitted to a rotatable support through a drive transmission mechanism which renders a brake mechanism inoperable and rotates a spin basket and when the motor is brought to stop by the inertia of the spin basket the brake mechanism is actuated and rotatable support is disconnected from the drive transmission mehanism thereby to immediately stop the rotation of the spin basket.

7 Claims, 3 Drawing Figures

PATENTED MAY 8 1973 3,731,394

CENTRIFUGAL DEHYDRATOR

BACKGROUND OF THE INVENTION

This invention relates to a centrifugal dehydrator provided with a brake mechanism for braking the rotation of a spin basket when a motor is deenergized.

In the prior art centrifugal dehydrator, said brake mechanism is controlled by an operating wire which is connected at one end to the hinge section of a dehydrator lid. When the dehydrator lid is opened, said operating wire is pulled in one direction by an elastic member for causing a brake shoe to be pressed against the brake drum of the brake mechanism. When the dehydrator lid is closed, said operating wire is pulled in the opposite direction against the force of said elastic member. Accordingly, said operating wire is always tightly stretched between the dehydrator lid and brake mechanism.

With the conventional centrifugal dehydrator, the working of said operating wire requires a sufficient moment to allow said wire to be moved against the force of said elastic member, necessarily demanding the rigid construction of the hinge section of the dehydrator lid and in consequence the bulkiness and high cost of the dehydrator as a whole. Further, the wire has to be stretched between the hinge section and brake mechanism within a relatively limited interior area of the dehydrator with a required tension. Therefore, the fitting of the wire consumes a great deal of time and work. Moreover, the wire tends to be slackened in tension due to its gradual physical deterioration with time, so that the braking of the spin basket cannot be effected reliably, preventing it from being stopped quickly. The prior art dehydrator has further drawback that since the wire is always kept in a tightly stretched state, the vibrations of the motor and brake mechanism are readily transmitted to the outer casing through said wire.

SUMMARY OF THE INVENTION

It is accordingly the object of this invention to provide a centrifugal dehydrator which comprises a mechanism for automatically braking the rotation of a spin basket at the stop of a motor without using an operating wire, thereby eliminating the necessity of particularly reinforcing the hinge section of a dehydrator lid, facilitating assembly, prominently extending the life of a brake mechanism and preventing unnecessary vibrations from being applied to an outer casing.

DETAILED DESCRIPTION OF THE INVENTION

Figure 3:
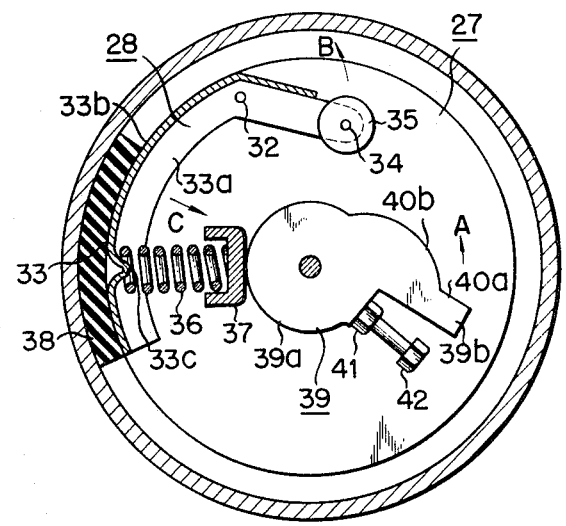
FIG. 3 is a sectional view on line 3—3 of the apparatus of FIG. 1.

There will now be described by reference to FIGS. 1 to 3 a centrifugal dehydrator according to an embodiment of this invention.

Figure 1:
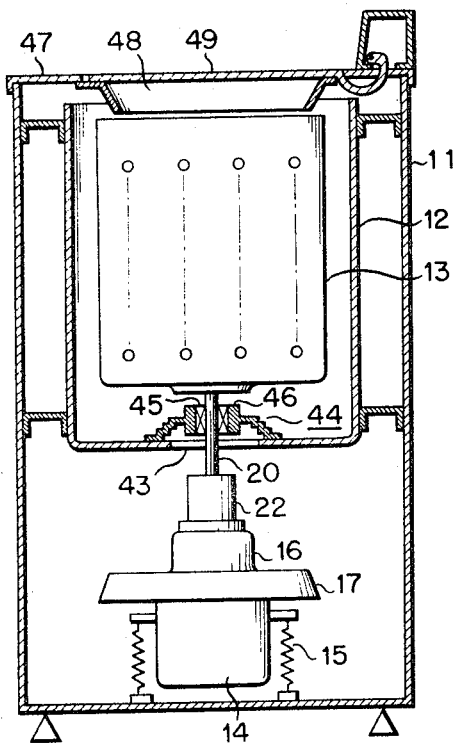
FIG. 1 is a sectional view of a centrifugal dehydrator according to an embodiment of this invention.
Figure 2:
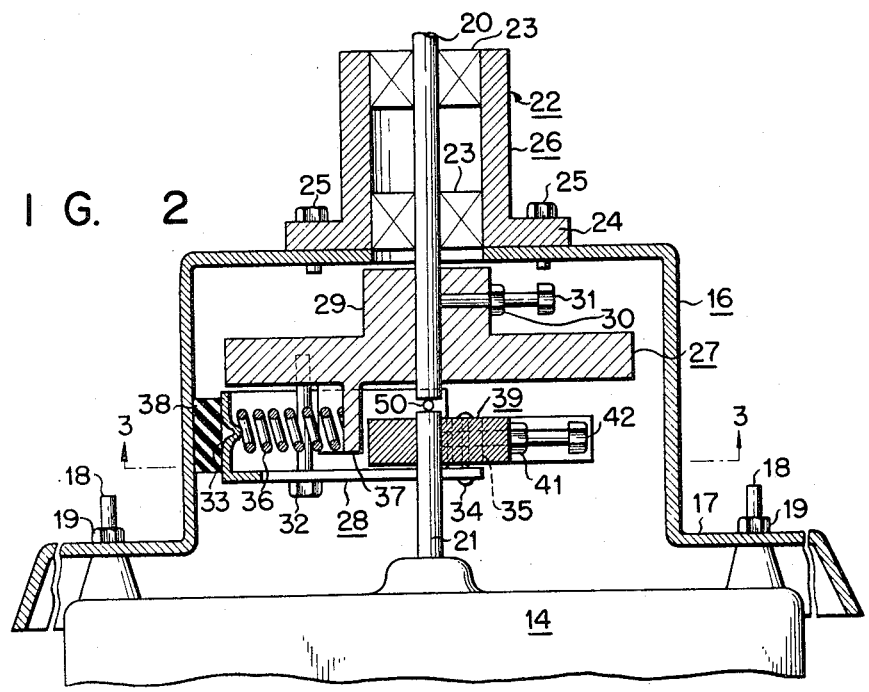
FIG. 2 is an enlarged sectional view of the brake mechanism of the centrifugal dehydrator of FIG. 1.

Referring to FIG. 1, numeral 11 represents an ordinary outer casing well known in the art. In the upper interior of the casing 11 is suspended a dehydration tank 12 in which there is disposed a rotatable spin basket 13 perforated with a large number of dehydration holes. In the lower interior of the casing is received a motor 14 for rotating the spin basket 13 centrifugally to dehydrate objects held therein. The motor 14 is mounted on an elastic member 15, for example, made of a plurality of springs erected on the inner wall of the bottom of the casing 11, thereby preventing the vibration of the motor 14 from being transmitted to the outer casing 11. Above the motor 14 is located a stationary cylindrical brake drum 16 open at the bottom. This brake drum 16 is fixed in place with a flange 17 at the bottom of said drum 16 fitted to the upper part of the motor 14 by studs 18 and nuts 19 (FIG. 2). The flange 17 is so formed as to cover the upper part of the motor 14, concurrently playing the part of preventing scattered water particles from falling to the motor 14. Downward from the under surface of the spin basket 13 extends a shaft 20, the bottom end of which is inserted into the brake drum 16 through a guide opening formed in its top surface to face the upper end of the rotatable shaft 21 of the motor 14 with a ball bearing 50 disposed therebetween. At the top of the brake drum 16 is mounted a bearing mechanism 22 comprising a pair of bearings 23 for rotatably supporting the intermediate part of the rotatable shaft 20, and a cylindrical housing 26 which receives said bearings 23 and is fixed in place with a flange 24 at the bottom end fitted to the brake drum 16 by bolts 25. To the free end of the rotatable shaft 20 which is inserted into the brake drum 16 is connected a disk support 27 coaxially with said shaft 20. On the upper surface of the disk support 27 is projectively fitted a cylindrical section 29 which is attached to the rotatable shaft 20 by a nut 30 and bolt 31, thereby to rotate with said shaft 20. To the underside of the disk support 27 is fitted an actuator 28 by a bolt 32 so as to rotate about it. This actuator 28 has a horizontal plate 33a (FIG. 3) which consists of a first section whose side wall takes an arcuate form and a second section bent inward from the first section at a prescribed angle starting with said bolt 32. At the free end of the second section is disposed a rotor 35 through a pivotal member 34, for example, a pin so as to rotate horizontally. The actuator 28 has a vertical pressure plate 33b upwardly extending from the outer edge of the horizontal plate 33a. The vertical pressure plate 33b has an arcuate section whose outer wall is pressed against the inner wall of the brake drum 16 through a brake shoe 38. On the inner wall of said arcuate section is formed an engagement projection 33c. Between said projection 33c and a spring seat 37 projectively fitted to the underside of the disk support 27 with a channel-shaped cross section there is stretched a compression spring 36 which outwardly urges the contact portion of the actuator 28. The brake shoe 38 fitted to the outer wall of said contact portion brakes the rotation of the spin basket 13 when brought into contact with the inner wall of the brake drum 16 by said contact portion.

The end portion of the rotary shaft 21 of the motor 14 is fitted with a pressure member or cam 39 by a nut 41 and bolt 42. This pressure member 39 consists of a disk section 39a whose center is penetrated by the rotatable shaft 21 and a projecting section 39b outwardly extending from said disk section 39a in a horizontal direction. Said projecting section 39b has a flat contact plane 40a formed on one side of the end. This contact plane 40a moves in the direction of the arrow A at the rotation of the rotatable shaft 21 of the motor 14 and is pressed against the roller 35 to rotate it in the direction of the arrow B, thus causing the vertical pressure member 33b to rotate about the bolt 32 in the direction of the arrow C against the force of the spring 36. The pressure member 39 further has a curved contact plane 40b formed on the same side as the flat contact plane 40a and extending from the disk section 39a to the projecting section 39b. This curved contact plane 40b temporarily slides along the peripheral surface of the roller 35 at the initial rotation of the rotatable shaft 21 of the motor 14.

The bottom of the dehydration tank 12 is perforated with a hole 43 through which to conduct the rotatable shaft 20. On the inner wall of the bottom of the dehydration tank 12 is provided a diaphragmatic flexible member 44 to prevent water from leaking through said hole 43. At the center of said flexible member 44 is disposed a housing 46 containing a bearing 45 for supporting the rotatable shaft 20.

Referring to FIG. 1, numeral 47 denotes the top edge plate of the dehydrator of this invention defining, as in the ordinary type, an opening 48 through which to throw objects into the dehydrator. Numeral 49 is a movable dehydrator lid, to which there is attached a lid switch (not shown) for controlling the drive of the motor 14 interlockingly with the movement of said dehydrator lid 49.

There will now be described the operation of the centrifugal dehydrator of this invention constructed as described above. Before the drive of the motor 14, the actuator 28 is deflected by a compression spring 36. The contact portion of the actuator 28 is pressed against the disk support 27 through the brake shoe 38 to render said disk support 27 immovable, thereby obstructing the rotation of the rotatable shaft 20 connected to said disk support 27 and in consequence the rotation of the spin basket. When the motor 14 is driven with a switch or timer (not shown) properly set, rotation of the shaft 21 of the motor 14 leads to the rotation of the pressure member 39 in the direction of the arrow A, initially causing the curved contact plane 40b of said pressure member 39 to be pressed against the roller 35. As the part of the roller 35 contacted by said curved contact plane 40b is gradually shifted, the flat contact plane 40a finally urges the roller 35 in the direction of the arrow B, causing the actuator 28 to rotate about the rotatable shaft 32 in the direction of the arrow C against the force of the spring 36. As the result, the brake shoe 38 fitted to the acutator 28 is detached from the inner wall of the brake drum 16, thus enabling the brake drum 16 or the rotatable shaft 20 to rotate. Since the roller 35 is so urged by the projecting contact member 39b of the pressure member 39 as to rotate in the direction of arrow B, the spin basket 13 connected to the rotatable shaft 20 rotates for dehydration. Namely, the drive of the motor 14 leads to the rotation of the pressure member 39, which in turn is pressed against the roller 35, enabling the spin basket 13 to be released from the braked condition and rotate substantially at the same time.

Where the motor 14 is going to be stopped during the rotation of the spin basket 13, either due to the opening of the dehydrator lid 49 with the resultant deenergization of the lid switch, or the completion of dehydration upon the consumption of the preset time of the timer, then the rotatable shaft 21 of the motor 14 is first brought to stop. Right after the stop of the motor 14, however, the spin basket 13 and the shaft 20 fitted thereto still continue to rotate quickly by inertia, so that the disk support 27 connected to the shaft 20 and the pressure member 39 connected to the rotatable shaft 21 of the motor 14 rotate at different speeds. Accordingly, the roller 35 of the actuator 28 pressed by the flat contact plane 40a of the pressure member 39 is detached therefrom through a sliding contact with the corved contact plane 40b of said pressure member 39. After detachment, the actuator 28 rotates by the force of the compression spring 36, causing the contact section 33 of the actuator 28 to be pressed against the inner wall of the brake drum 16 through the brake shoe 38, thereby stopping the shaft 20 and spin basket 13.

According to the aforementioned centrifugal dehydrator of this invention, the braking of the spin basket 13 is automatically effected by rotating the actuator 28 through the pressure member 39 integrally formed with the rotatable shaft 21 of the motor 14 either to cause the contact section 33 of the actuator to be pressed against the brake drum 16 for stopping the spin basket 13 or to release said contact. Accordingly, the centrifugal dehydrator of this invention completely eliminates the necessity of using an operating wire provided for the conventional type and is free from the difficulties which might otherwise occur.

In the foregoing embodiment, the brake drum 16 need not be formed into a cylindrical shape. Further the rotor fitted to the actuator may instead be attached to the pressure member or omitted at all. For improvement of the braking effect, it is possible to provide two or more actuators.

What is claimed is:

1. A centrifugal dehydrator comprising a spin basket provided with a rotatable shaft; support means fitted to said rotatable shaft; a brake mechanism comprising a movable brake member and stationary cylindrical member, the brake member rotatably supported by the support means and including a first section for carrying out braking action in co-operation with the stationary braking member and a second section for rotating the movable brake member to cause said braking action through engagement of the contact plane, said stationary cylindrical member receiving the support means and movable brake member; drive means provided with a drive shaft; and a drive transmission cam having a contact face and fitted to said drive shaft to rotate therewith, whereby, during dehydration, the rotation of said drive shaft is transmitted to the support means through the drive transmission means and the support means ceases the braking action of the brake means to permit the rotation of the spin basket, and when the drive shaft is going to be brought to stop, the inertia of the still rotating spin basket urges the movable member of the brake means to perform a braking action, thereby disconnecting the support means from the drive transmission means finally to brake the rotation of the spin basket.

2. The centrifugal dehydrator according to claim 1 wherein the support means has a projection; and there is stretched a compression spring between said projection and the movable brake member to urge the first section toward the stationary brake member to effect braking.

3. The centrifugal dehydrator according to claim 2 wherein the brake means has a brake shoe disposed between the stationary and movable brake members.

4. The centrifugal dehydrator according to claim 1 wherein the stationary brake member is provided with a flange for covering the drive means.

5. The centrifugal dehydrator according to claim 1 wherein the second section of the movable brake member comprises a roller.

6. The centrifugal dehydrator according to claim 1 wherein the contact face of the cam includes a curved plane pressed against the second section of the movable brake member at the initial and final rotation of the rotatable shaft of the drive source and a flat plane pressed against said second section during the full rotation of the rotatable shaft.

7. The centrifugal dehydrator according to claim 1 wherein the spin basket and drive means are received in a case, said drive means being supported in the case by elastic members.

* * * * *